(12) United States Patent
Heikkilä et al.

(10) Patent No.: US 9,848,374 B2
(45) Date of Patent: Dec. 19, 2017

(54) TECHNIQUE FOR MAINTAINING NETWORK SERVICE IDENTIFICATION RULES

(71) Applicant: Telefonaktiebolaget L M Ericsson (publ), Stockholm (SE)

(72) Inventors: Gunnar Heikkilä, Gammelstad (SE); András Rácz, Budapest (HU); András Veres, Budapest (HU)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 50 days.

(21) Appl. No.: 14/908,951

(22) PCT Filed: Aug. 27, 2013

(86) PCT No.: PCT/EP2013/067710
§ 371 (c)(1),
(2) Date: Jan. 29, 2016

(87) PCT Pub. No.: WO2015/028049
PCT Pub. Date: Mar. 5, 2015

(65) Prior Publication Data
US 2016/0198394 A1 Jul. 7, 2016

(51) Int. Cl.
*H04W 4/00* (2009.01)
*H04W 48/16* (2009.01)
(Continued)

(52) U.S. Cl.
CPC ............ *H04W 48/16* (2013.01); *H04L 41/16* (2013.01); *H04L 41/5054* (2013.01); *H04L 43/028* (2013.01); *H04L 43/065* (2013.01)

(58) Field of Classification Search
CPC .... H04W 48/16; H04L 41/16; H04L 41/5054; H04L 43/028; H04L 43/065
See application file for complete search history.

(56) References Cited

U.S. PATENT DOCUMENTS

| | | | | |
|---|---|---|---|---|
| 7,787,390 B1 * | 8/2010 | Orr | ..................... | H04L 41/0681 370/252 |
| 8,180,916 B1 * | 5/2012 | Nucci | ................... | H04L 43/028 709/223 |

(Continued)

FOREIGN PATENT DOCUMENTS

| | | | | |
|---|---|---|---|---|
| EP | 1622305 A1 * | 2/2006 | ............. | H04L 43/10 |
| WO | WO 2014/094818 A1 | 6/2014 | | |

OTHER PUBLICATIONS

International Search Report and Written Opinion of the International Searching Authority, Application No. PCT/EP2013/067710, dated May 27, 2014.

(Continued)

*Primary Examiner* — Kevin Mew
(74) *Attorney, Agent, or Firm* — Sage Patent Group

(57) ABSTRACT

Network services exchange data packets with mobile terminals wirelessly connected to a network. The network receives reports from a subset of the mobile terminals. The reports indicate network services used by the reporting mobile terminals. Various corresponding methods include the network associating one or more first data packets with one of the network services based on the reports. The first data packets originate from, or are addressed to, the reporting mobile terminals. The network derives or adapts, based on data included in the first data packets, one or more rules for identifying the network service based on data included in second data packets. The second data packets are different from the first data packets.

20 Claims, 7 Drawing Sheets

(51) Int. Cl.
*H04L 12/24* (2006.01)
*H04L 12/26* (2006.01)

(56) References Cited

U.S. PATENT DOCUMENTS

| | | | | |
|---|---|---|---|---|
| 8,441,961 | B1* | 5/2013 | Amberden | H04L 12/4625 370/254 |
| 8,964,548 | B1* | 2/2015 | Keralapura | H04L 43/026 370/235 |
| 9,349,102 | B2* | 5/2016 | Sen | G06N 99/005 |
| 2009/0204557 | A1* | 8/2009 | Zhang | G06K 9/00147 706/12 |
| 2010/0153316 | A1* | 6/2010 | Duffield | G06F 21/552 706/12 |
| 2010/0318652 | A1* | 12/2010 | Samba | H04L 41/5009 709/224 |
| 2011/0141924 | A1* | 6/2011 | Froehlich | H04L 41/0893 370/252 |
| 2011/0239273 | A1* | 9/2011 | Yang | G06F 21/577 726/3 |
| 2011/0314145 | A1* | 12/2011 | Raleigh | H04L 41/0893 709/224 |
| 2012/0033581 | A1* | 2/2012 | Torres Ramon | H04L 12/14 370/253 |
| 2014/0280829 | A1* | 9/2014 | Kjendal | H04L 43/028 709/223 |
| 2015/0127783 | A1* | 5/2015 | Lissack | H04L 41/5054 709/220 |

OTHER PUBLICATIONS

Erman et al., "Offline/realtime traffic classification using semi-supervised learning", *Performance Evaluation*, vol. 64, Aug. 25, 2007, pp. 1194-1213.

Finamore et al., "KISS: Stochastic Packet Inspection Classifier for UDP Traffic", *IEEE/ACM Transactions on Networking*, vol. 18, No. 5, Oct. 2010.

Yu et al., "Traffic flooding attach detection with SNMP MIB using SVM" *Computer Communications*, vol. 31, Nov. 1, 2008, pp. 4212-4219.

* cited by examiner 118, 120

700

| Rule | Network Service | Matching Level 138 | |
|---|---|---|---|
| | | Data Packet 6 504 Header: F5 Data: 24NS2LA | Data Packet 7 Header: F6 ... 504 Data: 5AHFLAT |
| xAHFyy | NS1 | 0 | 86 |
| nnNS2xx | NS2 ⋮ | 100 | 0 |

Fig. 7

TECHNIQUE FOR MAINTAINING NETWORK SERVICE IDENTIFICATION RULES

CROSS REFERENCE TO RELATED APPLICATION

This application is a 35 U.S.C. §371 national stage application of PCT International Application No. PCT/EP2013/067710, filed on Aug. 27, 2013, the disclosure and content of which is incorporated by reference herein in its entirety. The above-referenced PCT International Application was published in the English language as International Publication No. WO 2015/028049 A1 on Mar. 5, 2015.

TECHNICAL FIELD

The present disclosure relates to rules for identifying network services. In particular, and without limitation, the disclosure relates to a method and a device for maintaining rules that allow identifying network services by Deep Packet Inspection.

BACKGROUND

The increasing mobile data traffic is driven by an increasing variety of network services, ranging from ordinary voice calls to advanced services based on client applications executed at mobile devices. An operator of a cellular network may want to optimize the network behavior for certain services or may want to treat certain services in a predefined way. For example, data of an e-mail service can be routed along predefined paths in the network for improving data security. Such a service-dependent behavior of the network requires that each of the network services, or the client applications corresponding to the network service, can be identified at the side of the network.

Deep Packet Inspection (DPI) is a common technique for classifying data traffic by identifying certain services within the data traffic routed by a node in the network. The DPI functionality can be provided by specific DPI nodes in the network or can be integrated into existing nodes of the network. DPI applies a set of rules when inspecting the data traffic. Each of the rules can be based on a data model for data packets in a dataflow associated with a certain network service. When the inspected data traffic matches the data model, the corresponding dataflow is assumed to originate from the client application of the service identified by the service-specific data model.

The reliability of service identification by means of DPI strongly depends on the accuracy of the rule associated to the service to be identified. With properly developed application behavior models, the DPI rules achieve satisfactory rates of correctly identifying which network service is provided and/or which client application is executed therefor at the mobile terminal. While DPI can theoretically provide full inside as to the network services underlying the data traffic in the network, developing such DPI rules is one of the main limiting factors for reliably identifying the large and increasing number of different mobile services.

Conventionally, the development of DPI rules requires collecting network data for known use-cases. For example, test network sessions are initiated for exchanging data of a certain service using the corresponding client application. When enough network data from a plurality of test sessions has been collected, the network data is analyzed and a DPI rule is manually developed for identifying the service, or the corresponding client application, based on the network data.

Furthermore, the laborious development of DPI rules has to be repeated, as new services come into existence or the behavior of existing services, in particular the behavior of the corresponding client applications, changes over time. The rules thus have to be maintained by continuously developing new rules and updating the developed rules. In practice, only a small fraction of the thousands or even millions of client applications relevant for optimizing the network behavior can be handled by the conventional manual DPI training.

SUMMARY

Accordingly, there is a need for a technique that allows identifying certain network services underlying data packets forwarded in a network, even without manually training data models for the data packets.

According to one aspect, a method of maintaining rules for identifying network services that exchange data packets with mobile terminals wirelessly connected to a network is provided. The network receives from a subset of the mobile terminals reports indicative of network services used by the reporting mobile terminals. The method comprises the following steps performed in the network: associating one or more first data packets with one of the network services based on one or more of the reports, the first data packets originating from or being addressed to the reporting mobile terminals; and deriving or adapting, based on data included in the one or more first data packets, one of the rules for identifying the one of the network services based on data included in one or more second data packets, wherein the one or more second data packets are different from the one or more first data packets.

The technique can be implemented so that a service-specific rule is maintained based on the exchange of first data packets involving few reporting mobile terminals resulting in an effective rule applicable to the second data packets of all mobile terminals. At least some implementations of the technique can achieve at least one of automated maintenance of service identifying rules, scalability as to the number of mobile terminals, scalability as to the number of different network services for which the rules are maintained, a reduction in the number of reporting mobile terminals, a reduction in the network traffic necessary for maintaining the rules, and improving an identification rate for network services exhibiting a changing network data structure. For example, a data volume of network traffic necessary for maintaining the rules can scale linearly with the number of different network services and/or can be independent of the number of mobile terminals.

The first data packets may be associated with one of the network services based on the reports (which may also be referred to as a report-based association). The report-based association may identify the one network service underlying each of the first data packets based on a header field included in the first data packets. The second data packets may be associated with one of the network services based on the rules (rule-based association). The rule-based association may identify the one network service underlying the one or more second data packets based on a data field included in the second data packets.

The exchanged data packets, e.g., the first and/or second data packets, may be received from the mobile terminals and/or sent towards the mobile terminals. The exchanged data packets may be received at one or more nodes of the network, e.g., for forwarding the data packets.

A node of the network receiving at least the first data packets may perform the method (which node is also referred to as a rule-maintaining node). The derivation or adaption of one of the rules may be based on a plurality of first data packets associated with one of the network services based on the reports. A plurality of first data packets may be stored for the step of deriving or adapting. The plurality of first data packets may be deleted after the step of deriving or adapting. The one or more first data packets may originate from, or may be addressed to, one or all of the reporting mobile terminals of the subset. The one or more second data packets may originate from, or may be addressed to, one of the mobile terminals wirelessly connected to the network and not included in the subset.

A node receiving at least the second data packets may apply the rules (which node is also referred to as a rule-applying node). The rules may be applied by a Deep Packet Investigation (DPI) mechanism. The rules may be stored in the network, at the rule-maintaining node, at the rule-applying node, and/or may be accessible to any other node in the network.

The maintaining of the rules may include at least one of adapting an existing rule and deriving a new rule, e.g., for an emerging network service. A new rule may be derived in response to receiving a report indicative of an associated network service for which no rule exists. Some or all of the rules may include a data pattern (also referred to as a data model). The data pattern corresponding to one of the network services may include a bit pattern, a regular expression, a packet size pattern or an arrival time pattern. The step of deriving or adapting may include extracting a data pattern from a data field of the one or more first data packets. Alternatively or in addition, the step of deriving or adapting may include changing a portion of the data pattern of the existing rule, which portion has changed according to the first data packets. The data pattern may be extracted or changed so that the data pattern is common to all of the one or more first data packets belonging to the one of the network services.

The rule-maintaining node may receive the reports from a terminal agent executed at each of the reporting mobile terminals. Each of the reports may be indicative of a communication endpoint. The report may indicate the communication endpoint in association with one of the network services used by the reporting one of the mobile terminal or a client application executed or executable at the mobile terminal. The communication endpoint may also be indicated in each of the one or more first data packets and/or each of the one or more second data packets. The communication endpoint may be included in a header field of the first data packets and/or the second data packets. The step of associating based on the reports may include retrieving the communication endpoint from the header field of the first data packet.

The communication endpoint may be a network socket bound to the client application of the network service. The communication endpoint may be a source and/or a destination of the exchanged data packets. The communication endpoint may specify an Internet Protocol (IP) address and/or a port number. Each of the reported network services may use a unique client application or a group of processes executed or executable at the mobile terminal. Each of the rules may be configured for identifying one of the network services independently of the reports.

The second data packet may be associated with one of the network services by applying one or more of the rules to at least the data included in the second data packet. The data included in the second data packet may be deleted from the rule-applying node after the rule-based association. A plurality of rules may be applied to the second data packet. A matching level for a candidate network service may be computed according to each of the applied rules. The network service having the highest matching level among the candidate network services may be associated with the second data packet.

The candidate network services having a matching level above a candidate threshold value may be sorted by the matching level. Network services below the candidate threshold value may be excluded. A second data packet without a network service candidate having a matching level above the candidate threshold value remains unassociated. The matching level may quantify an overlap between the data pattern according to the rule corresponding to the network service and the data in the second data packet.

The rules may also be applied to the first data packets, e.g., for verifying the correctness and/or assessing the accuracy of the rule. The correctness may be verified by comparing the network service identified using the rule with the network service associated using the report. Any one of the features and steps disclosed for the rule-based association of the second data packet may also be included in the application of the rule to the first data packets.

At least one of an indicator of failure and an indicator of success may be stored for some or all of the rules. The indicators may be implemented as integer counters. Before the step of deriving or adapting, an existing one of the rules may be applied to the one or more first data packets that have been associated with the one of the network services based on the reports. The existing rule may be configured for identifying the same one network service. The indicator of failure of the rule may be incremented, if the rule fails to identify the same one network service. Otherwise, the indicator of success is incremented.

Some or all of the rules may be continuously or periodically applied to the first data packets. The existing rule may be applied to those first data packets that have been associated, based on the reports, with the network service corresponding to the rule. The storing of an indicator of failure and an indicator of success, and/or the applying of the existing rules may be restricted to rules configured for identifying network services, the usage of which exceeds a usage-frequency threshold value. The failure of a rule may encompass that the rule fails to associate to the first data packet a network service, e.g., if the matching level computed according to the rule is below the candidate threshold value. Alternatively or in combination, the failure of a rule may encompass that the network service associated according to the rule is different from the network service associated according to the report, e.g., because the application of another one of the rules results in a higher matching level.

Data included in the one or more first data packets may be stored, if the existing rules fail to identify the same one network service. The failure may be determined based on a previously received report indicating the dataflow, wherein the one or more first data packets belong to the indicated dataflow, while the rules identify another network service or none. The stored one or more first data packets may be associated to the underlying network service (and, thus, associated to a missing rule that is to be derived or an existing that has failed) based on the previously received reports. The missing rule may be derived, and the existing rule that has failed may be adapted. The derivation and adaption of the rule may use at least the stored data.

Alternatively or in combination, when one or more rules (e.g., rules for one or more network services) are to be derived or adapted, all first data packets (e.g., the data packets belonging to all dataflows of the reporting mobile terminals) may be stored preemptively until the next report is received and indicates which client application (and, thus, which network service) actually corresponds to the stored first data packets. The data of those one or more first data packets belonging to a dataflow, the rule of which is not to be derived or adapted, is deleted at the rule-maintaining node.

The data of those one or more first data packets belonging to a dataflow, the rule of which is to be derived or adapted, is kept in storage until enough data has been stored, and the derivation or adaption has been completed.

The adaption may be triggered by at least the indicator of failure exceeding a failure threshold value. E.g., a failure ratio may be computed based on both the failure indicator and the success indicator. The adaption may be triggered when the failure ratio exceeds a failure ratio threshold value. The adapted rule may update the existing rule. The adapted rule may enhance or replace the existing rule. Alternatively or in addition, the derivation of the rule may be triggered, if no rule exists for a network service exceeding the usage-frequency threshold value.

Those first data packets that are associated based on the reports with one of the network services for which one the rule-based association failed, may be stored. The stored data is also referred to as a data trace. The first data packets may be stored in association with the corresponding one of the network services. The storing may be triggered when the indicator of failure or the failure ratio for the corresponding network service exceeds the failure threshold value or the failure ratio threshold value.

Alternatively, the first data packets are stored preemptively. The derivation or adaption may start when the failure threshold value or the failure ratio threshold value is exceeded and a number of the first data packets stored for the network service exceeds a sufficiency threshold value. The indicator of failure and the indicator of success may be reset after the adapting the rule.

Alternatively or in addition, a number of mobile terminals, which are reporting on one or more network services for which the indicator of failure has exceeded the corresponding threshold value, may be increased. E.g., an activation message may be sent to one or more mobile terminals not in the subset for activating the sending of the reports for the one or more network services. Activating further mobile terminals that are not yet included in the subset of currently reporting mobile terminals may accelerate an acquisition of data from the first data packets used for the derivation or adaption of the rule.

Furthermore, a deactivation message may be sent from the network to each mobile terminal of the subset for deactivating the sending of the reports to the network. Alternatively or in combination, an activation message may be sent from the network to each mobile terminal of a disjoint subset of the mobile terminals for activating the sending of the reports to the network. Switching the subset can reduce or eliminate a bias in the data basis provided by the first data packets.

Moreover, the existing rule for one of the network services may be adapted, if a data field of the second data packets received at the node changes so that the existing rule fails to identify the network service, while a dataflow indicator in the second data packets, e.g., the communication endpoint in a header field of the second data packets, does not change. The existing rule may be adapted based on the changed data included in the second data packets.

According to another aspect, a computer program product is provided comprising program code portions for carrying out any step described herein when the computer program product is executed on one or more computing devices. A computer readable recording medium storing the computer program product according is also provided. The computer program product may be provided for download to the computer readable recording medium, e.g., via the Internet.

As to a hardware aspect, a device for maintaining rules for identifying network services that exchange data packets with mobile terminals wirelessly connected to a network is provide. The network receives from a subset of the mobile terminals reports indicative of network services used by the reporting mobile terminals. The device comprises the following units located at or accessible to the network: an associating unit adapted to associate one or more first data packets with one of the network services based on one or more of the reports, the first data packets originating from or being addressed to the reporting mobile terminals; and a deriving unit adapted to derive, based on data included in the one or more first data packets, one of the rules for identifying the one of the network services based on data included in a second data packet, wherein the second data packet is different from the one or more first data packets.

The device may further comprise any feature disclosed in the context of the method aspect. The units of the device, or a dedicated unit, may be adapted to perform any one of the steps disclosed for the method aspect.

According to still another aspect, a network for providing network services that exchange data packets with mobile terminals wirelessly connected to the network is provided. The network comprises one or more nodes configured to receive from a subset of the mobile terminals reports indicative of network services used by the reporting mobile terminals. At least some of the one or more nodes include or have access to a device for maintaining rules for identifying the network services according to the hardware aspect.

The network may include at least one of the rule-maintaining node, the rule-applying node and a node combining the functionality of both maintaining and applying the rules. The network, e.g., the rule-maintaining node, may activate and/or deactivate the terminal agents in the subset.

BRIEF DESCRIPTION OF THE DRAWINGS

Further aspects and advantages of the technique presented herein will become apparent from the following description of preferred embodiments and associated drawings, wherein FIG. 1 schematically illustrates a network for implementing the technique;

FIG. 7 shows a table including results from applying rules, which are maintained according to the method embodiment of FIG. 2, to the second data packets shown in FIG. 6.

DETAILED DESCRIPTION

In the following description of preferred embodiments, for purposes of explanation and not limitation, specific details are set forth, such as particular signal processing components and sequences of steps, in order to provide a thorough understanding of the present invention. It will be apparent to one of skill in the art that the technique described herein may be practiced in other embodiments that depart from these specific details. For example, while the following embodiments are primarily described in terms of a terminal and a network in radio communication forming a cellular communication network, the invention can also be applied in the context of a wireless communication according to the set of specifications according to IEEE 802.11 or by means of Near Field Communication (NFC). Furthermore, while the following embodiments implement the technique within existing nodes or components of a cellular network, the technique can also be implemented partially or completely relying on one or more dedicated nodes or components.

Moreover, those skilled in the art will appreciate that the services, components, functions and steps explained herein may be implemented using software functioning in conjunction with a programmed microprocessor, an Application Specific Integrated Circuit (ASIC), a Digital Signal Processor (DSP) or a general purpose computer. It will also be appreciated that, while the following embodiments are primarily described in context with methods and devices, the invention may also be embodied in a computer program product as well as in a system comprising a processor and a memory coupled to the processor, wherein the memory is encoded with one or more programs that are adapted to perform the services, components, functions and steps disclosed herein.

Figure 1:
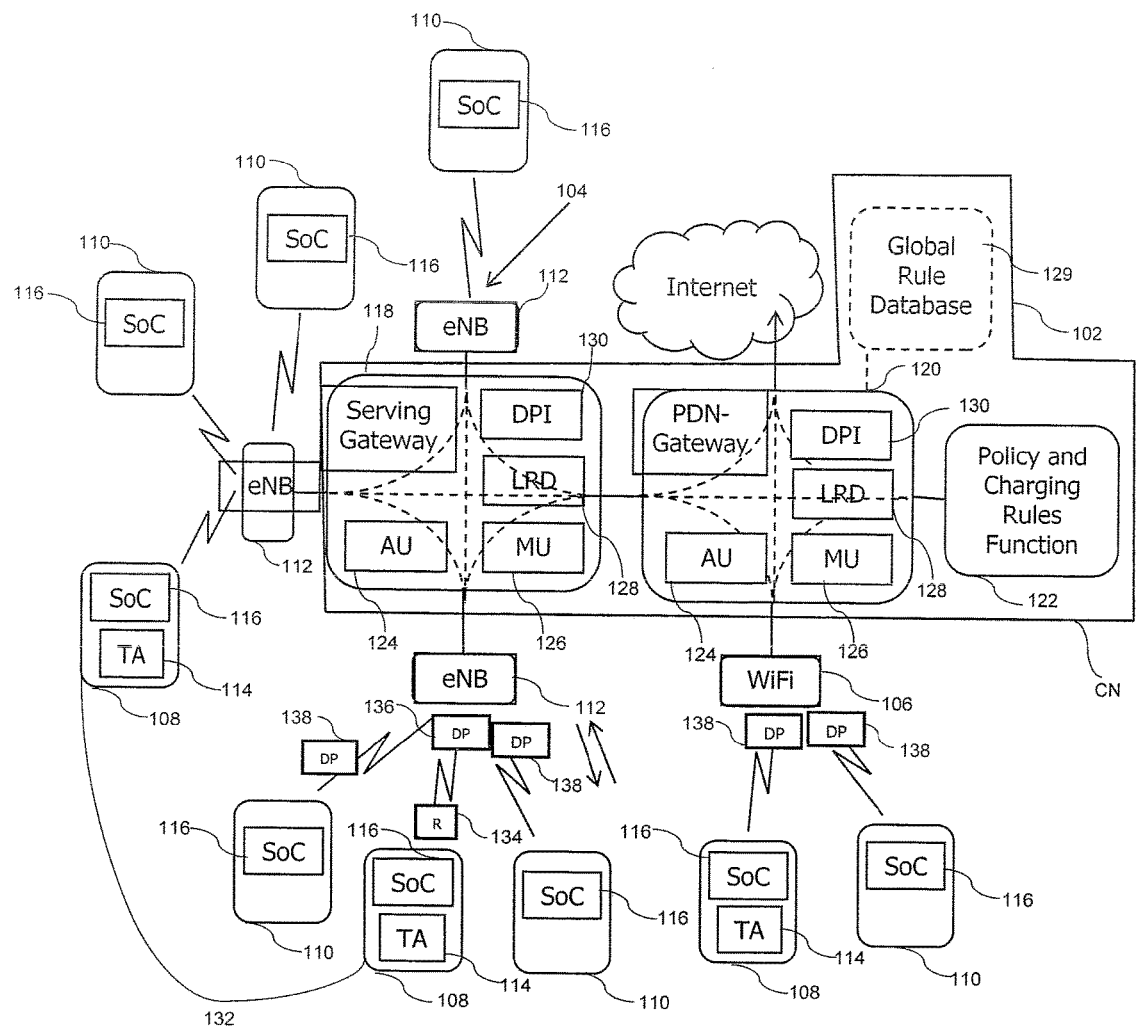

FIG. 1 schematically illustrates an embodiment of a cellular network 100 as an exemplary system environment for implementing any one of the embodiments described herein below. The network 100 comprises a Core Network (CN) 102 and one or more Radio Access Networks (RANs) 104, 106 providing bidirectional wireless data links to a plurality of mobile terminals 108, 110. For example, the RAN 104 can be implemented according to Evolved Universal Terrestrial Radio Access (E-UTRA) including a plurality of base stations 112, each of which implements an eNodeB according to Long Term Evolution (LTE).

At least some of the mobile terminals 108 include a terminal agent 114 adapted to identify one or more processes executed by a computing unit 116 within the mobile terminal 108. The computing unit 116 includes a processor, e.g., an ARM processor, coupled to memory for performing a mobile operating system and the processes of client applications. In the embodiment schematically illustrated in FIG. 1, the computing unit is implemented by a System on a Chip (SoC).

The CN 102 includes a Serving Gateway 118, a Packet Data Network Gateway (PDN Gateway) 120 and a Policy and Charging Rules Function (PCRF) 122. Each of the gateways 118 and 120 includes an associating unit 124, a maintaining unit 126, a local rule database 128 and a Data Packet Investigation (DPI) unit 130. The CN 102 optionally includes a global rule database 129. The global rule database 129 is directly or indirectly accessible to the nodes in the CN 102, which nodes include at least one of the maintaining unit 126 and the DPI unit 130.

The terminal agent 114 is activated by receiving at the mobile terminal 108 an activation message, e.g., sent by any one of the nodes 118 or 120 of the CN 102. FIG. 1 shows a subset 132 of the mobile terminals 108 including the terminal agent 114 in the active state. The activated terminal agent 114 regularly sends reports 134 to the network 100, e.g., to any of the nodes 118 or 120 of the CN 102. Each of the reports 134 indicates one or more of the client applications executed by the computing unit 116 of the corresponding mobile terminal 108 or indicates one or more of the network services corresponding to the client applications. The reported one or more client applications receive first data packets 136 from the network 100 and/or submits first data packets 136 to the network 100.

Mobile terminals that are not included in the subset 132, e.g., mobile terminals 108 which terminal agent 114 is in an inactive state and the mobile terminals 110 not including the functionality of the terminal agent 114, also include a computing unit 116 for executing processes of client applications accessing the network 100. The client applications of mobile terminals that not included in the subset 132 receive second data packets 138 from the network 100 and/or submit second data packets 138 to the network 100. The client applications of mobile terminals in the subset 132 involved in the exchange of first data packets 136 can be at least partially identical to client applications involved in the exchange of second data packets 138. In particular, the presence of an active terminal agent 114 does not affect the client applications involved in the exchange of the first data packets 136.

Each of the first and second data packets 136, 138 includes a header field. The header field uniquely identifies a dataflow, e.g., by indicating a communication end-point of the dataflow. Each of the dataflows is uniquely bound to one of the client applications.

The activated terminal agent 114 includes in each of the reports 134 an identifier of at least one dataflow in association with a descriptor of the corresponding client application using the reported dataflow. Alternatively or in addition, the report includes a descriptor of the corresponding network service. Moreover, a negative list may be sent to the terminal agents 114. The negative list is indicative of network services for which no association is to be reported. A positive list may be sent to the terminal agents 114. The positive list is indicative of network services for which associated dataflows are to be reported. Alternatively or in addition to the network service, the lists may indicate the client application of the corresponding network service. By deactivating the currently used subset 132 and activating a different subset, a bias introduced by a usage behavior of the reporting mobile terminals can be detected and/or eliminated.

Figure 2:
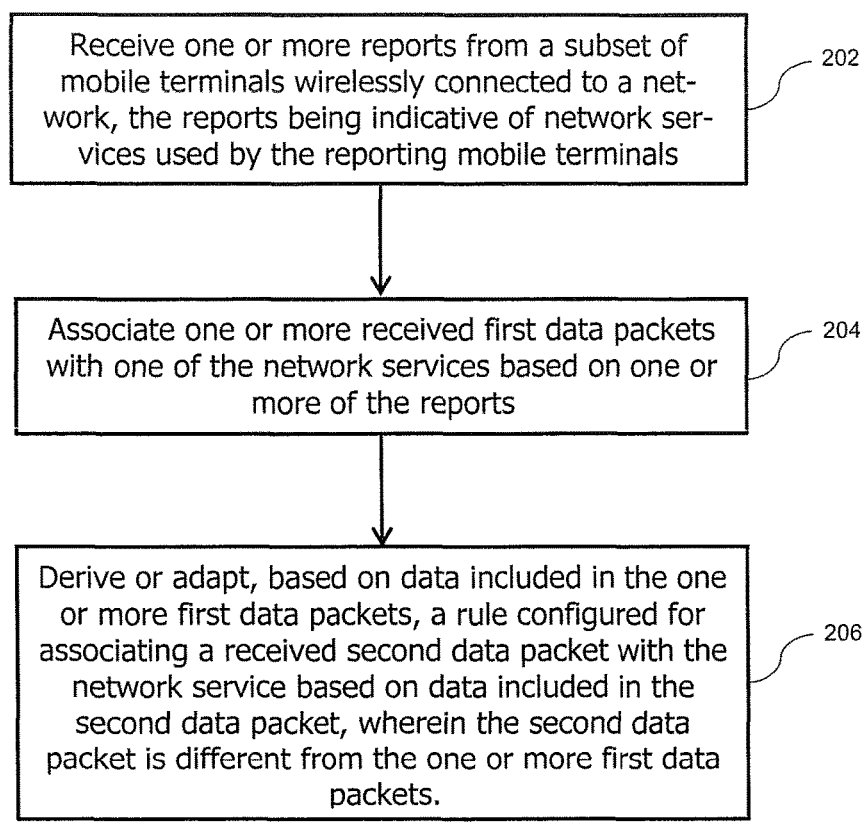
FIG. 2 shows a flowchart of a method embodiment that can be performed by one or more nodes of the network shown in FIG. 1.

FIG. 2 shows a flowchart of a method embodiment 200 for maintaining rules for identifying network services that exchange data packets with mobile terminals wirelessly connected to a network. The network receives from a subset of the mobile terminals reports indicative of network services used by the reporting mobile terminals in a step 202. The network further receives first data packets originating from or being addressed to the reporting mobile terminals. In a step 204, the one or more received first data packets are associated with one of the network services based on one or more of the reports. The association may be indirect involving a client application that is indicated in the report, wherein the network has access to a database associating the client application with the corresponding network service. Alternatively, the knowledge of the client application can be considered as equivalent to the knowledge of the network service.

In a step 206 of the method 200, the network derives or adapts, based on data included in the one or more first data packets, a rule that is configured for associating a received second data packet with the network service based on the data included in the second data packet. The second data packet is not identical to any one of the one or more first data packets. The number of second data packets 138 analyzed by the rule is not limited. The number of mobile terminals 110, which client applications can be identified by the rule, is not limited.

The subset of reporting mobile terminals can be the subset 132 of the mobile terminals 108 with terminal agent functionality, out of the plurality of mobile terminals 108 and 110 wirelessly connected to the network 100. Any one of the steps 202, 204 and 206 can be performed by one or more of the nodes in the network 100, e.g., within the CN 102. More specifically, the step 204 of associating first data packets with one of the network services can be performed by the associating unit 124. The step 206 of deriving or adapting a rule can be performed by the maintaining unit 126. The rules derived or adapted in the step 206 can be stored within the same node 118 or 120 performing the step 206 in the corresponding local rule database 128. Alternatively or in addition, the rule derived or adapted in the step 206 is stored in the global rule database 129.

Implementing the method 200 in one or more of the nodes of the network 100 achieves, at least in some network contexts, a fully automatized maintenance of DPI rules. Existing rules can be automatically adapted to changes in protocols, data formats or content of the corresponding service. Newly emerging services can be automatically detected, based on the dataflow identifiers included in the reports 134 without a corresponding rule existing in the rule databases 128 or 129 for the corresponding network service. E.g., based on patterns common to all first data packets belonging to the same network service, new rules can be derived and existing rules can be updated.

The technique does not require that all mobile terminals provide the functionality of the terminal agent 114. In some implementations of the technique, less than 10%, or even less than 2%, of the wirelessly connected mobile terminals 108 and 110 have, on average, the terminal agent 114 installed. A few reporting mobile terminals in the subset 132, each of which provides both the first data packets 136 as the data pool for the step 206 of maintaining the rules and the reports 134 for identifying in the step 204 the client applications, or the network services, underlying the corresponding first data packets 136. The minority of reporting terminals forming the subset 132 is leveraged by virtue of the rules applicable to an unlimited number of any other second data packet 138.

Consequently, mobile resources (e.g., in terms of energy, computation time, and/or memory) required for the active terminal agent 114 and network capacity required for the reports is significantly reduced and becomes negligible the larger the network. There is no limit as to the number of services detectable by means of the rules.

As a further advantage over a prior art network identifying the network services directly by means of reports, not all mobile terminals 108, 110 might support such a reporting terminal agent 114. Furthermore, not all users of the mobile terminals 108, 110 might be willing to accept installing such a terminal agent 114. There is no limit in terms of the number of mobile terminals 108 and 110 benefiting from the service identification of the network.

The service identification based on the rules resulting from the step 206 has many different advantageous applications. For example, the network 100 may optimize a routing behavior of some or all nodes depending on the network service or a more general service class encompassing a plurality of similar services. For example, video calls using different services, such as Skype and FaceTime, are individually identified and treated according to the same routing policy.

As a further example, an e-mail service may be detected by means of the rules resulting from the step 206, and the network 100 may apply a routing policy that avoids or minimizes cross-border data exchange. As an advantage, an e-mail having addressor and addressee within the same country is routed without leaving the country depending on a security setting for the e-mail service.

As another exemplary use-case of identifying network services, requirements as to Quality of Service (QoS) can be fulfilled more efficiently by the network 100. For example, requirements as to a maximum delay, jitter and a minimum data rate can be fulfilled specifically for those services requiring high QoS, even if the network 100 is not capable of providing such a high QoS for all network services using the network 100. For instance, voice and video calls have higher requirements as to delay and jitter as compared to download services. Conversely, download services may require higher mean data rates as compared to voice call services. Service-individual QoS requirements can be implemented by a routing behavior of some or all nodes in the network 100 prioritizing the data packets 136, 138 depending on the service identified by means of the rules maintained by the technique presented herein.

The method 200 may further comprise the step of activating the subset 132 of reporting mobile terminals prior to the step 202. The step 204 of associating each of the first data packets 136 with one of the network services may further comprise storing in detail the first data packets in association with the reported one of the applications or services.

The terminal agents 114 and the reports 134 are implemented in accordance with co-pending international application PCT/EP2012/075761. The technique presented herein can be implemented based on the reporting mechanism described in the application PCT/EP2012/075761 by adding the functionality for maintaining the rules according to the method 200 by means of the units 124 and 126 in at least one of to the nodes of the network 100. Even with only a small subset 132 of active terminal agents 114, sufficient statistical coverage of essentially all client applications and/or relevant network services is possible. The number of active terminal agents 114 can thus be reduced and/or the number of network services covered by DPI rules can be increased beyond what has been possible by explicit terminal reporting according to PCT/EP 2012/075761 or by conventional manual DPI training.

Figure 3:
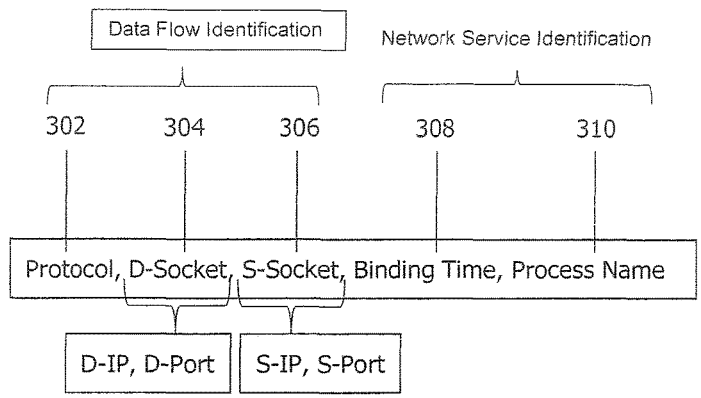
FIG. 3 schematically illustrates an exemplary data structure of a report provided by a subset of the mobile terminals shown in FIG. 1.

FIG. 3 schematically illustrates a data structure for an isolated service identification report 134. In response to a network socket binding event within the operating system executed by the computing unit 116, the terminal agent 114 is triggered by the binding event and stores at least a network socket and a process name to which the network socket is bound by the event. The network socket can comprise an Internet Protocol (IP) address and a port number. In the exemplary report 134 illustrated in FIG. 3, a protocol 302, a destination socket 304 and a source socket 306 identify the dataflow. The report 134 further comprises a binding time 308 and a process name 310, which identify the network service. The report 134 optionally includes a sending time. Based on a time difference between the reception of the report in the step 202 and the sending time, the binding time 308 is corrected by the network 100.

Figure 4:
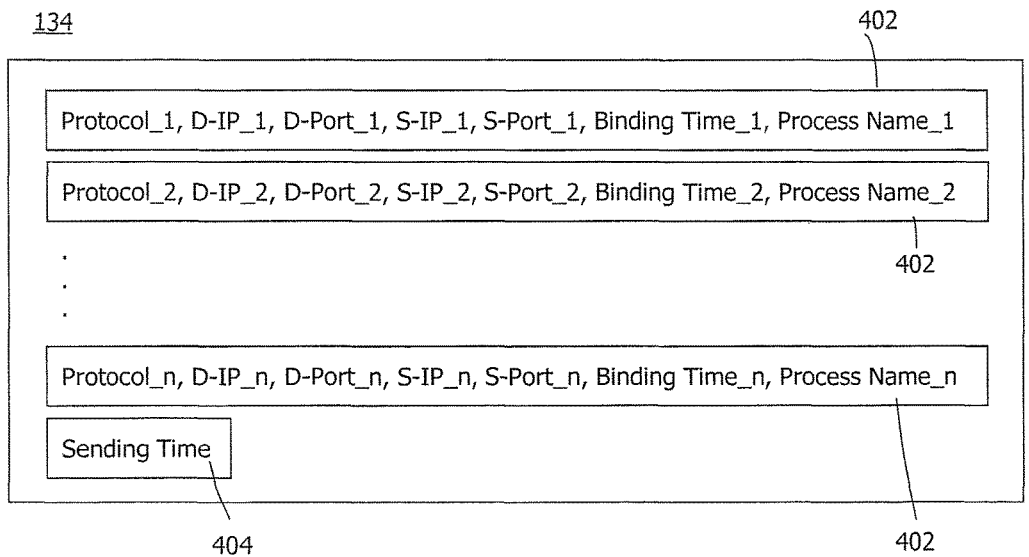
FIG. 4 schematically illustrates an exemplary data structure of a more complex report provided by a subset of the mobile terminals shown in FIG. 1.

FIG. 4 schematically illustrates a data structure for a collected service identification report 134. Entries 402 of a plurality of binding events in the corresponding mobile terminal of the active terminal agent 114 are collected and submitted to the network 100 in the report 134. The report 134 further includes a sending time 404. Based on the time difference between the reported sending time and the actual time of reception in the step 202, the network is able to correct for any offset in a terminal clock used by the terminal agent 114. For instance, a user of the mobile terminal 108 might not have set the clock correctly, or might use wintertime instead of summertime, or Central European Time instead of Pacific Standard Time, etc. By comparing the time of reception of the report 134 at the network with the reported sending time, and assuming a reasonably fast transmission, a time offset can be calculated so that the socket binding reports 134 can be corrected to the global network time.

Figure 5:
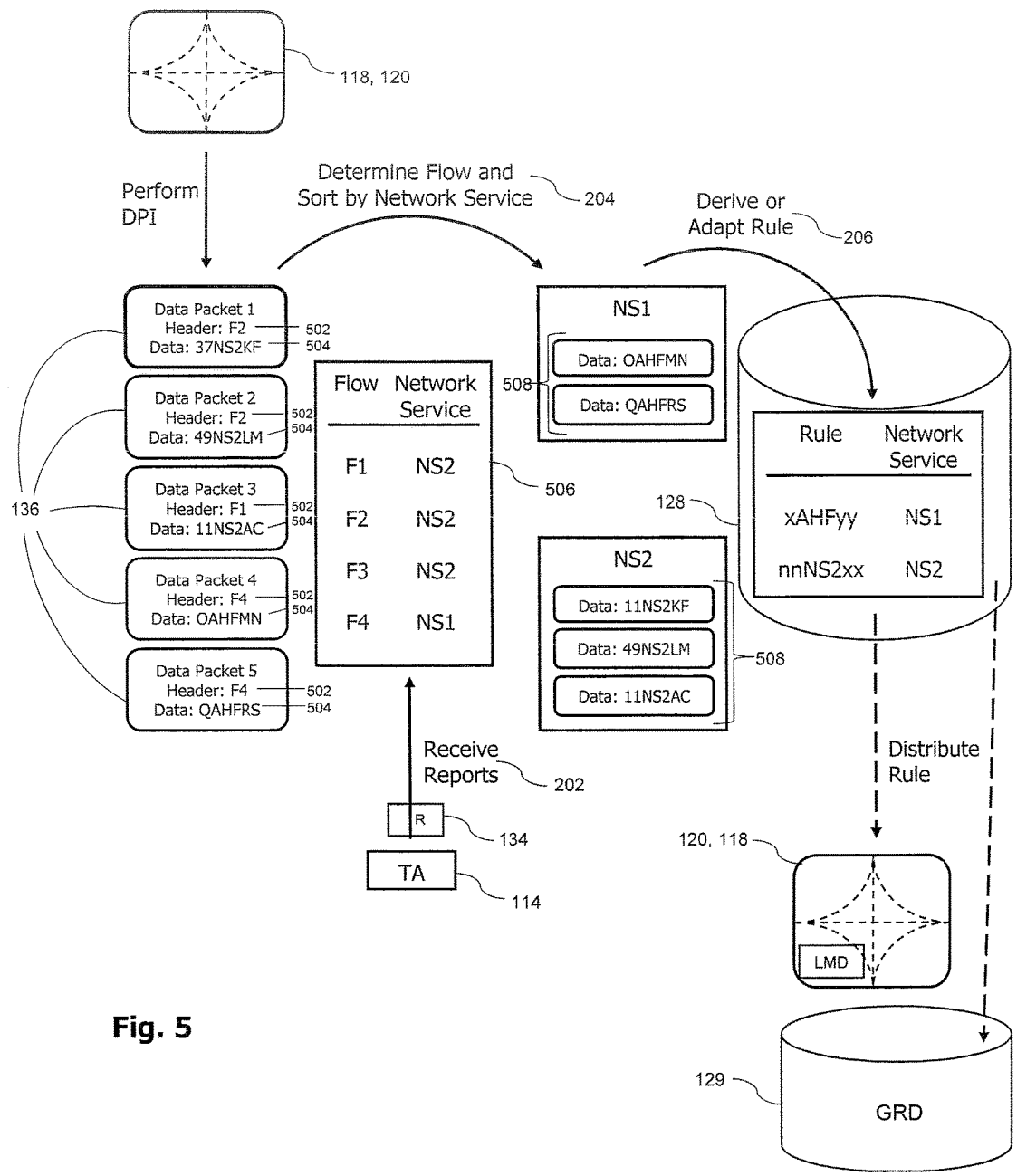
FIG. 5 schematically illustrates steps and intermediate results of the method embodiment of FIG. 2.

FIG. 5 schematically illustrates the method embodiment 200 in more detail including intermediate results. A plurality of first data packets 136 is to be forwarded by a node, e.g., the node 118 or 120, in the network 100. Each of the first data packets 136 includes a header field 502 and a data field 504. The header field 502 includes an identifier for the dataflow (e.g., F1, F2, F3, F4), to which the corresponding first data packet 136 belongs. For example, the header field 502 includes at least one of the destination socket 304 and the source socket 306 as the dataflow identifier.

Generally, none of the first or second data packets 136 and 138 has to include a network service identifier. In the step 204 of associating each of the first data packets to one of the network services, the header field 502 is read and the corresponding dataflow is identified. The reports previously received in the step 202 are stored in a local report database 506. The associating step 204 further includes searching in the local report database 506 for a network service entry associated with the identified dataflow. The local report database 506 is sorted by the dataflow identifiers for rapidly accessing the associated network service.

The extracted data from the data fields 504 is collected in association with the corresponding network service as a result of the associating step 204. The data collected in association with each of the network service is also referred to as a data trace 508.

The data traces 508 provide the statistical basis for deriving or adapting one rule for each of the network services in the step 206. The resulting rules are stored in the local rule database 128. Optionally, the rules derived at one of the nodes in the network 100 are distributed to another one or all other nodes of the network adapted for applying the rules, e.g., by means of the DPI unit 130. The distributed rules can be stored in the corresponding local rule database 128 of the other network node or in the global rule database 129.

Figure 6:
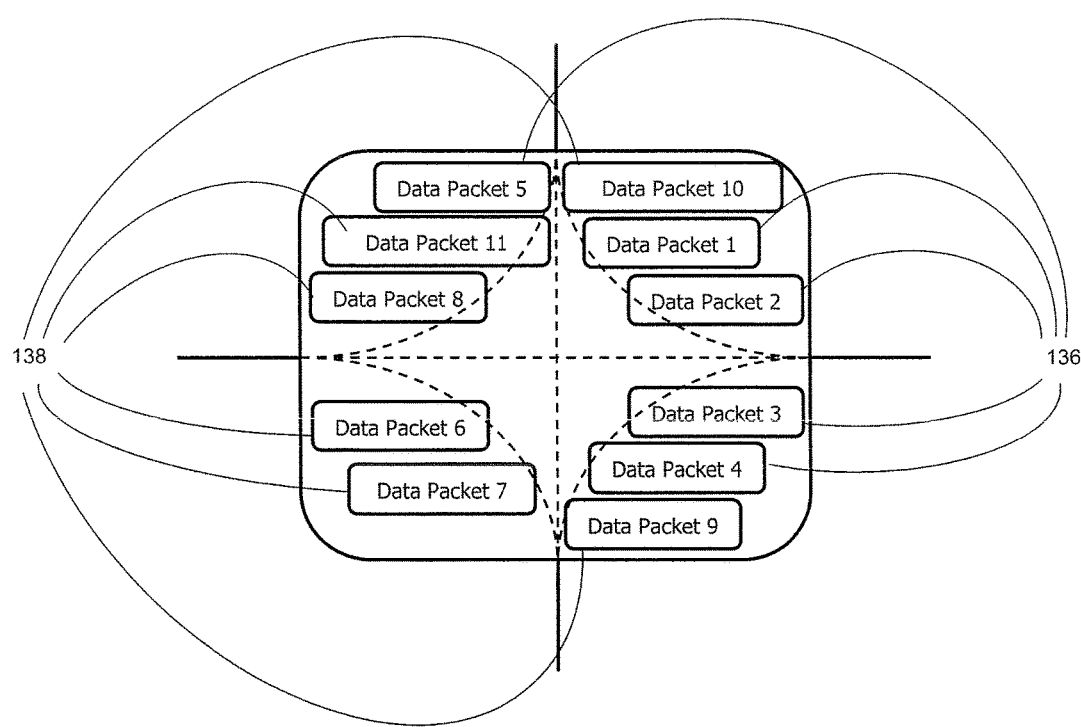
FIG. 6 schematically illustrates first data packets and second data packets routed by a node of the network shown in FIG. 1.

FIG. 6 schematically illustrates a plurality of data packets 136, 138 to be routed by a node in the network 100. A conventional DPI node in the network without the rule-maintaining functionality of the technique disclosed herein can be integrated by receiving the rules derived in the step 206 and applying the rules to the data packets to be routed as second data packets 138. For the conventional DPI node, all received data packets are second data packets 138. In an alternative implementation, the technique presented herein is embodied in a dedicated node of the network 100 without DPI functionality. For the node dedicated for maintaining the identification rules, all received data packets are first data packets 136.

The node schematically illustrated in FIG. 6 combines the technique presented herein for maintaining the identification rules and the conventional DPI functionality for applying the maintained rules. Data packets belonging to the dataflows F1 to F4 listed in the local report database 506 are first data packets 136, the report for the dataflow F5 to be received from one of the terminal agents 114 is outstanding, and all other data packets received for routing are second data packets 138.

FIG. 7 shows a Table 700 resulting from the application of the maintained rules to the second data packets 138. For each network service to be identified, there is one or more rules representing a data model for segments of data included in the data field 504 of the second data packets 138. Applying the rule to the data field 504 yields a matching level for each combination of network service to be identified and second data packet 138 to be investigated.

In one implementation, the second data packets 138 are associated to the network service of the rule yielding a matching level above a predefined matching threshold value. In an advanced implementation, the network service corresponding to the rule is considered as a candidate network service potentially underlying the corresponding second data packets 138, if the matching level exceeds a predefined candidate threshold value. The second data packets 138 are associated with the network service having the highest matching level among the candidate network services.

In the example shown in FIG. 7, the network service denoted by NS2 is identified as the network service underlying the second data packet 138 denoted by "data packet 6". The network service NS1 is identified as the network service underlying the second data packet 138 denoted by "data packet 7". The data flows F5 and F6 indicated in the second data packets "data packet 6" and "data packet 7", respectively, are thus associated to the network services NS2 and NS1, respectively.

The technique thus allows identifying network services even for dataflows not terminating at any one of the reporting mobile terminals of the subset 132. The scaling effect of enlarging the number of data flows independent of the finite size of the subset 132 can be further improved by changing some or all of the wireless terminals 108 defining the subset 132, e.g., when all matching levels of existing rules applied to one or more second data packets 138 do not exceed the matching threshold value or the candidate threshold value. The failure of exceeding the corresponding threshold indicates that the network service underlying the corresponding second data packet has been changed or is new. The matching failure may thus trigger a change in the subset 132 for updating the existing rules or deriving a new rule for successfully identifying the changed or new network service.

Figure 8:
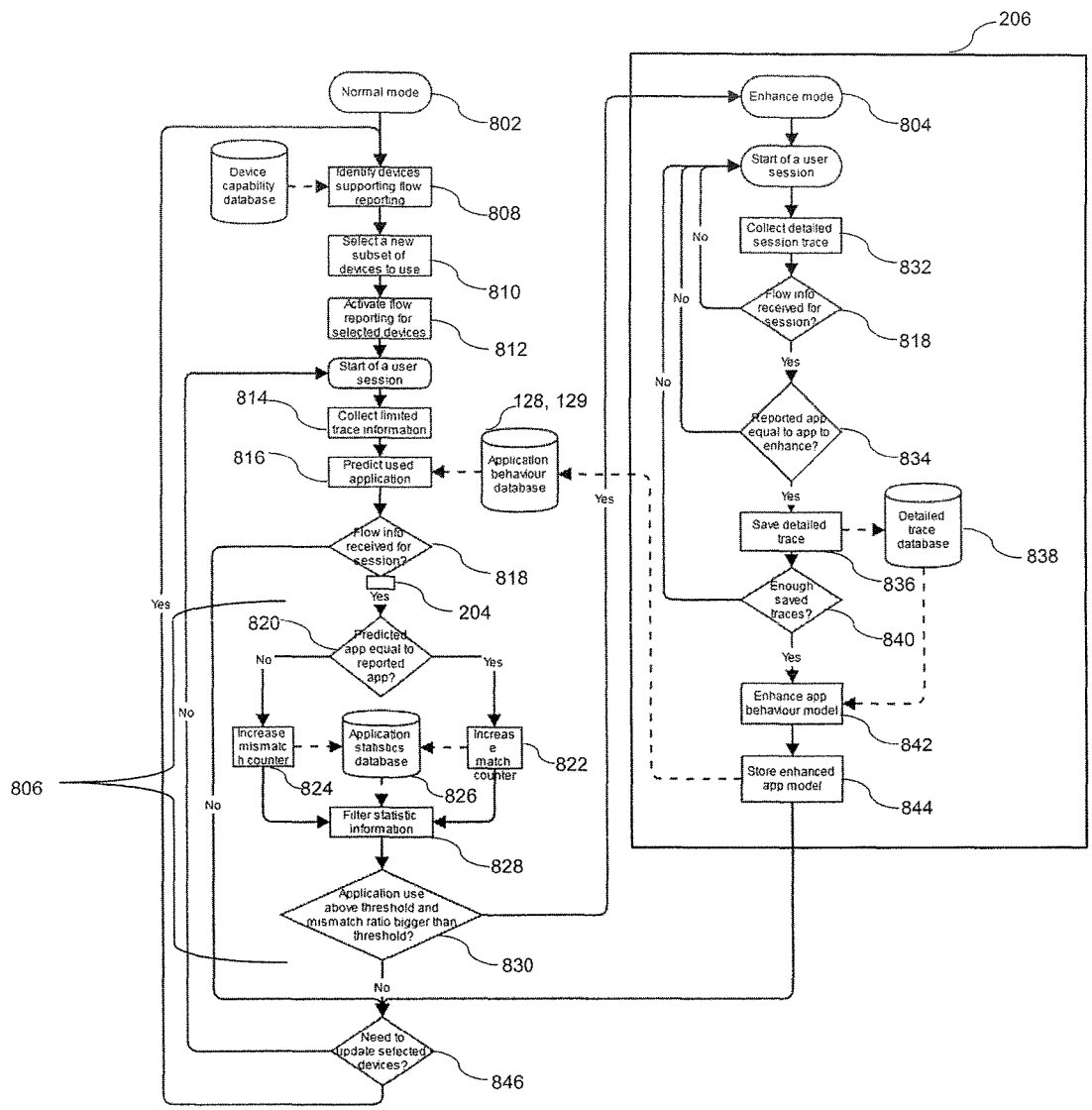
FIG. 8 shows a flowchart including further details of the method embodiment shown in FIG. 2.

FIG. 8 shows a flowchart of a more detailed embodiment of the method 200 of maintaining rules for identifying network services. The method 200 shown in FIG. 8 differs from the method 200 shown in FIG. 2 in that a criterion for triggering the step 206 of deriving or adapting the rules is included in the method 200 shown in FIG. 8. Furthermore, the method 200 shown in FIG. 8 refers to the network service using the corresponding "application", i.e., the client application of the network service.

The method 200 shown in FIG. 8 includes a normal mode 802 and an enhanced mode 804. The normal mode 802 includes the steps 202 and 204 and applies in a group of step 806 the triggering criterion for deciding whether or not to trigger the step 206 in the enhanced mode 804. The criterion is a relative failure rate of a certain rule or a ratio of success and failure for the certain rule. E.g., if the rule fails in more than 5%, or more than 10%, of its applications (to the corresponding first data packets 136), the rule is adapted according to the step 206.

The network 100 performing the method 200 provides a conventional DPI functionality and the terminal reporting mechanism by means of the terminal agents 114. Only a limited data trace has to be collected in the step 814 for the dataflow of second data packets 138. During normal DPI classification of the data traffic, the rules (also referred to as classification algorithms) are directly applied in a step 816 to the data in the data fields 504 of the second data packets 138 without storing any detailed data after the network service has been identified or a more general classification of the second data packet 138 has been achieved. Consequently, storage requirements are minimized with benefit of the scaling effect.

In the normal mode 802, the small subset 132 of terminal agents 114 is activated by the steps 808, 810 and 812, which trigger the step 202 of receiving corresponding reports 134. The reports 134 indicate the client application used at the reporting wireless terminal 108 and indicates which IP dataflow these client applications are using. The result from applying the existing rules in the step 816 stored in the rule database 128 or 129 to these IP dataflows is then continuously compared in the step 820 to the client application reported as used in the step 204, if a report corresponding to the dataflow is found in the step 818 among the reports received in the step 202.

The result is match 822 (i.e., success of the existing rule) or mismatch 824 (i.e., failure of the rule). A pair of counters for success and failure is stored in an application statistics database 826 for each of the rules (e.g., for each of the monitored client applications). In a step 828, a percentage of mismatches, or a failure ratio between the counter of failure and the counter of success, is computed for each of the monitored client applications. When the percentage of mismatches or the failure ratio for any one of the monitored client applications becomes higher than a failure-ratio threshold value, the step 206 of updating or deriving rules is triggered in a step 830. Exceeding the failure-ratio threshold value indicates that the corresponding client application behavior is no longer accurately enough modeled by the existing rule in the rule database 128 or 129. The deriving step 206 can also be necessary due to new applications being deployed at the reporting mobile terminal 108.

In an advanced implementation, the triggering criterion of the step 830 avoids creating rules for applications with low usage. The step 206 is only performed, if the usage of the corresponding client application is above a certain usage-frequency threshold value.

During the step 206, the DPI function collects in a step 832 a much more extensive data trace 508 of data from the first data packets 136, typically a complete data packet trace covering parts of the session or even the complete session, in contrast to the limited trace collected in the step 814. The step 832 is performed for all sessions for the selected subset angle 32 of reporting mobile terminals 108.

To preserve memory space, the detailed session traces 508 are only stored for a limited time. As soon as a terminal agent 114 reports back the client applications for its traces of first data packets 136, which is verified in step 834, all data traces not relevant for the currently derived or adapted rule are deleted in the step 836. The saved and relevant traces of first data packets 136 are stored in a detailed trace database 838 until enough saved data traces 508 are available according to a step 840. The sufficiently large data trace 508 of first data packets 136 associated with the client application (the rule of which is to be enhanced) is sent to an application modeling function in a step 842. In the case of a new client application, the application modeling function derives a new rule. In the case of an existing rule for the client application, the client application modeling function enhances the existing rule for more accurately modeling the client application behavior. The derived or adapted rule is stored in the rule database 128 or 129 in a step 844.

If progress based on the adapted or derived rules towards a more accurate modeling of the client application behavior is not fast enough, e.g., due to too low usage of the application, a different subset 132 or a larger subset 132 of reporting mobile terminals 108 is activated for reporting in a step 846.

Alternatively or in addition, the subset 132 of terminals activated for reporting is also continuously changed over time in the step 846, so that a good statistical coverage is achieved. Continuously changing the subset 132 may further minimize an individual impact of user behavior on the maintained rules in the rule databases 128 and 129.

As has become apparent from above exemplary embodiments of the technique presented herein, at least some embodiments achieve a fully automatic maintaining of rules for network-based traffic classification. DPI rules can be maintained for a large number of client applications. The maintained rules can even include previously unclassified client applications.

The level of rule maintenance can be adjusted so that a minimal subset of reporting terminals needs to report back to the network. At the same time, highly accurate rules can be achieved for network traffic classification. The technique is thus scalable to large networks and the additionally required network data traffic is limited.

The technique allows easily defining usage-frequency threshold values for identifying largely used network services based on the maintained rules. The technique allows not only automatically deriving or adapting the rules. The derivation and adapting itself can be automatically triggered when a predefined failure-rate threshold value is exceeded.

The presented technique may, of course, be carried out in other ways than those specifically set forth herein without departing from the invention. The presented embodiments are to be considered in all respects as illustrative and not restrictive, and all changes within the scope of the appended claims are embraced therein.

The invention claimed is:
1. A method of maintaining rules for identifying network services that exchange data packets with mobile terminals wirelessly connected to a network, the method comprising the following steps performed within the network:
   receiving, from reporting mobile terminals that are a subset of the mobile terminals, reports indicative of network services used by the reporting mobile terminals;

receiving one or more first data packets originating from or being addressed to the reporting mobile terminals;

associating the one or more first data packets with one of the network services based on one or more of the reports;

receiving one or more second data packets; and deriving or adapting, based on data included in the one or more first data packets, one or more of the rules for identifying the one of the network services based on data included in the one or more second data packets, wherein the one or more second data packets are different from the one or more first data packets.

2. The method of claim 1, wherein each of the reports is indicative of a communication endpoint in association with one of the network services used by the reporting one of the mobile terminals, wherein the communication endpoint is indicated in the one or more first data packets.

3. The method of claim 2, wherein the reports are received from a terminal agent executed by each of the reporting mobile terminals, wherein the report is indicative of the network service by specifying a client application of the network service, which is executed at the reporting one of the mobile terminals, and wherein the communication endpoint uniquely identifies a network socket used by the client application.

4. The method of claim 1, wherein each of the rules is configured for identifying one of the network services independently of the reports.

5. The method of claim 1, wherein the derivation or the adaptation of one of the rules is based on a plurality of first data packets associated with one of the network services based on the reports, and wherein the derivation or the adaption includes deriving at least one of a bit pattern or regular expression that is common to all of the first data packets for the one of the network services, a packet arrival pattern or a packet arrival time distribution of the first data packets for the one of the network services, a packet size pattern or a packet size distribution of the first data packets for the one of the network services.

6. The method of claim 1, further comprising:

associating the one or more second data packet with one of the network services by applying one or more of the rules to at least the data included in the second data packet, wherein a plurality of rules is applied to one of the second data packets, wherein a matching level for a candidate network service is computed according to each of the applied rules, and wherein the network service having the highest matching level among the candidate network services is associated with the second data packets.

7. The method of claim 1, wherein at least one of an indicator of failure and an indicator of success is stored for some or each of the rules, the method further comprising:

applying, before the derivation or the adaption, an existing one of the rules to the one or more first data packets that have been associated with the one of the network services, wherein the existing rule is configured for identifying the same one network service; and at least one of incrementing the indicator of failure of the rule, if the rule fails to identify the same one network service, and incrementing the indicator of success of the rule, if the rule succeeds to identify the same one network service.

8. The method of claim 7, wherein data included in the one or more first data packets is stored, if the rule fails to identify the same one network service, wherein the derivation or adaption uses the stored data, and wherein data included in the one or more first data packets is deleted, if the rule succeeds to identify the same one network service.

9. The method of claim 7, wherein the derivation or the adaptation is triggered and the derived or adapted rule enhances or replaces the existing rule, if at least one of the indicators exceeds a threshold value, optionally if a ratio between the indicator of failure and the indicator of success exceeds a failure ratio threshold value.

10. A computer program product comprising a non-transitory computer readable storage medium storing program code executable by at least one processor to perform the method of claim 1.

11. A device for maintaining rules for identifying network services that exchange data packets with mobile terminals wirelessly connected to a network, the device comprising the following located at or accessible to the network:

at least one processor configured to:

receive, from reporting mobile terminals that are a subset of the mobile terminals, reports indicative of network services used by the reporting mobile terminals;

receive one or more first data packets originating from or being addressed to the reporting mobile terminals;

associate the one or more first data packets with one of the network services based on one or more of the reports;

receive one or more second data packets; and derive or adapt, based on data included in the one or more first data packets, one or more of the rules for identifying the one of the network services based on data included in the one or more second data packets, wherein the one or more second data packets are different from the one or more first data packets.

12. A network for providing network services that exchange data packets with mobile terminals wirelessly connected to the network, the network comprising one or more nodes configured to receive from a subset of the mobile terminals reports indicative of network services used by the reporting mobile terminals, at least some of the one or more nodes including or accessing a device for maintaining rules for identifying the network services according to claim 11.

13. The device of claim 11, wherein each of the reports is indicative of a communication endpoint in association with one of the network services used by the reporting one of the mobile terminals, wherein the communication endpoint is indicated in the one or more first data packets.

14. The device of claim 13, wherein the reports are received from a terminal agent executed by each of the reporting mobile terminals, wherein the report is indicative of the network service by specifying a client application of the network service, which is executed at the reporting one of the mobile terminals, and wherein the communication endpoint uniquely identifies a network socket used by the client application.

15. The device of claim 11, wherein each of the rules is configured for identifying one of the network services independently of the reports.

16. The device of claim 11, wherein the derivation or the adaptation of one of the rules is based on a plurality of first data packets associated with one of the network services based on the reports, and wherein the derivation or the adaption includes deriving at least one of a bit pattern or regular expression that is common to all of the first data packets for the one of the network services, a packet arrival pattern or a packet arrival time distribution of the first data packets for the one of the network services, a packet size pattern or a packet size distribution of the first data packets for the one of the network services.

17. The device of claim 11, wherein the at least one processor is further configured to:
associate the one or more second data packet with one of the network services by applying one or more of the rules to at least the data included in the second data packet,
wherein a plurality of rules is applied to one of the second data packets,
wherein a matching level for a candidate network service is computed according to each of the applied rules, and
wherein the network service having the highest matching level among the candidate network services is associated with the second data packets.

18. The device of claim 11, wherein at least one of an indicator of failure and an indicator of success is stored for some or each of the rules, wherein the at least one processor is further configured to:
apply, before the derivation or the adaption, an existing one of the rules to the one or more first data packets that have been associated with the one of the network services, wherein the existing rule is configured for identifying the same one network service; and
perform at least one of incrementing the indicator of failure of the rule, if the rule fails to identify the same one network service, and incrementing the indicator of success of the rule, if the rule succeeds to identify the same one network service.

19. The device of claim 18, wherein data included in the one or more first data packets is stored, if the rule fails to identify the same one network service, wherein the derivation or adaption uses the stored data, and
wherein data included in the one or more first data packets is deleted, if the rule succeeds to identify the same one network service.

20. The device of claim 18, wherein the derivation or the adaptation is triggered and the derived or adapted rule enhances or replaces the existing rule, if at least one of the indicators exceeds a threshold value, optionally if a ratio between the indicator of failure and the indicator of success exceeds a failure ratio threshold value.

* * * * *